(12) United States Patent
Confoey

(10) Patent No.: US 7,766,271 B1
(45) Date of Patent: Aug. 3, 2010

(54) STRAP COLLECTION DEVICE FOR TENSIONING A RATCHET

(76) Inventor: Richard Confoey, 15846 Heiser Rd., Berlin Center, OH (US) 44401

( * ) Notice: Subject to any disclaimer, the term of this patent is extended or adjusted under 35 U.S.C. 154(b) by 0 days.

(21) Appl. No.: 12/319,780

(22) Filed: Jan. 13, 2009

(51) Int. Cl.
*B65H 75/30* (2006.01)

(52) U.S. Cl. ........... 242/395; 242/396.1; 242/405.1; 242/615.3; 24/68 CD; 24/909

(58) Field of Classification Search ............ 242/395, 242/395.1, 396, 396.1, 400.1, 402, 405, 405.1, 242/588, 615, 615.3, 486.9, 487; 24/68 CD, 24/909; 254/217, 218; 410/96, 97, 103
See application file for complete search history.

(56) References Cited

U.S. PATENT DOCUMENTS

| | | | | |
|---|---|---|---|---|
| 1,199,790 | A | * | 10/1916 | Holcomb ............ 242/405.3 |
| 3,085,767 | A | * | 4/1963 | Zerbest ............ 242/396.1 |
| 3,558,101 | A | * | 1/1971 | Ward ............ 242/395 |
| 4,852,822 | A | * | 8/1989 | Brady ............ 242/405.3 |
| 5,505,404 | A | * | 4/1996 | Dubreuil ............ 242/532.6 |
| 5,611,520 | A | | 3/1997 | Soderstrom |
| D390,094 | S | * | 2/1998 | Pamplin ............ D8/359 |
| 5,975,454 | A | | 11/1999 | Potter et al. |
| 6,068,210 | A | | 5/2000 | Risa |
| 6,102,371 | A | | 8/2000 | Wyers |
| D452,953 | S | | 1/2002 | Okkema |
| 6,729,604 | B1 | * | 5/2004 | Claycomb ............ 254/217 |
| 7,017,847 | B2 | * | 3/2006 | Treat ............ 242/395 |
| 7,100,902 | B1 | | 9/2006 | Lu |
| 7,216,849 | B2 | | 5/2007 | Tremblay |
| 7,296,326 | B2 | | 11/2007 | Madachy et al. |
| 2004/0094650 | A1 | | 5/2004 | Huang |
| 2004/0108404 | A1 | * | 6/2004 | Wiermaa ............ 242/532.6 |
| 2005/0092862 | A1 | * | 5/2005 | Treat ............ 242/395 |

FOREIGN PATENT DOCUMENTS

WO    WO 93/18937    9/1993

* cited by examiner

*Primary Examiner*—William A Rivera
(74) *Attorney, Agent, or Firm*—Harpman & Harpman

(57) ABSTRACT

A hand activated retainment, storage and deployment device for binding straps used to secure loads on cargo transportation vehicles such as tractor trailers. The device has a winding mechanism with a spooling reel for winding excess binding strap during use and for removable storage of the strap when not deployed.

3 Claims, 3 Drawing Sheets

STRAP COLLECTION DEVICE FOR TENSIONING A RATCHET

BACKGROUND OF THE INVENTION

1. Technical Field

The present invention is related to winding devices for winding binding straps. Such devices are typically hand operated to winch up lengths of binding straps used to secure loads during transportation on vehicles.

2. Description of Prior Art

Prior art devices of this type include a variety of strap winding configurations with integrated strap ratchet adjustments, see for example U.S. Pat. Nos. 6,102,371, 7,100,902, 7,216,849, 7,296,326, U.S. Publication 2004/0094650 and international application WO9318937.

Independent strap winches can be seen in U.S. Pat. Nos. 5,611,520, 5,975,454, 6,068,210 and D452,953.

In U.S. Pat. No. 6,102,371 a strap tensioning and collection device is described having a ratchet arm assembly and a strap storage section associated therewith.

U.S. Pat. No. 7,100,902 is directed to a hand pull device for winding a binding strap in which a ratchet arm pulls and foreshortens the strap and the excess strap is collected on an attached winding wheel.

U.S. Pat. No. 7,216,849 claims a winch with a storage reel extending therefrom in which the strap material can be wound.

U.S. Pat. No. 7,296,326 illustrates a cargo tightening and strap collector having a ratchet strap engagement arm with a strap collection shaft with oppositely disposed actuation knobs.

U.S. Publication 2004/0094650 shows a strap fastener system for fastening a belt and integrated strap winding device.

A strap collector is disclosed in international patent WO9318937 with a cargo tightener and a magazine for collection and protection of a long tensioning strap.

Further shown in U.S. Pat. No. 5,611,520 a strap collector is illustrated having a cargo tightening arm and a magazine to collect and store the cargo strap.

U.S. Pat. No. 5,975,454 discloses an independent strap winder having a hand grip with a strap engagement hub. A handle allows the winding of cargo straps thereabout.

U.S. Pat. No. 6,068,210 is directed to a spooling device having a support portion with a strap engagement spool rotatably positioned therefrom and interconnected crank handle.

Finally, in design patent D452,953 a tie down strap rewinder is shown having a frame defining a hand grip, a spool and a hand crank extending therefrom.

SUMMARY OF THE INVENTION

A portable repositionable user or activated binding strap winder retainer for winding binding straps used on a load retainment system as well as independent strap storage and deployment. The strap winder of the invention includes an integrated support frame with a selectively secured strap receiving spindle rotatably positioned therein and crank handle extending therefrom. Secondary strap and positioning arm and removable crank locking pin is provided for positioning therethrough restricting the rotation thereof.

DETAILED DESCRIPTION OF THE INVENTION

Figure 1:
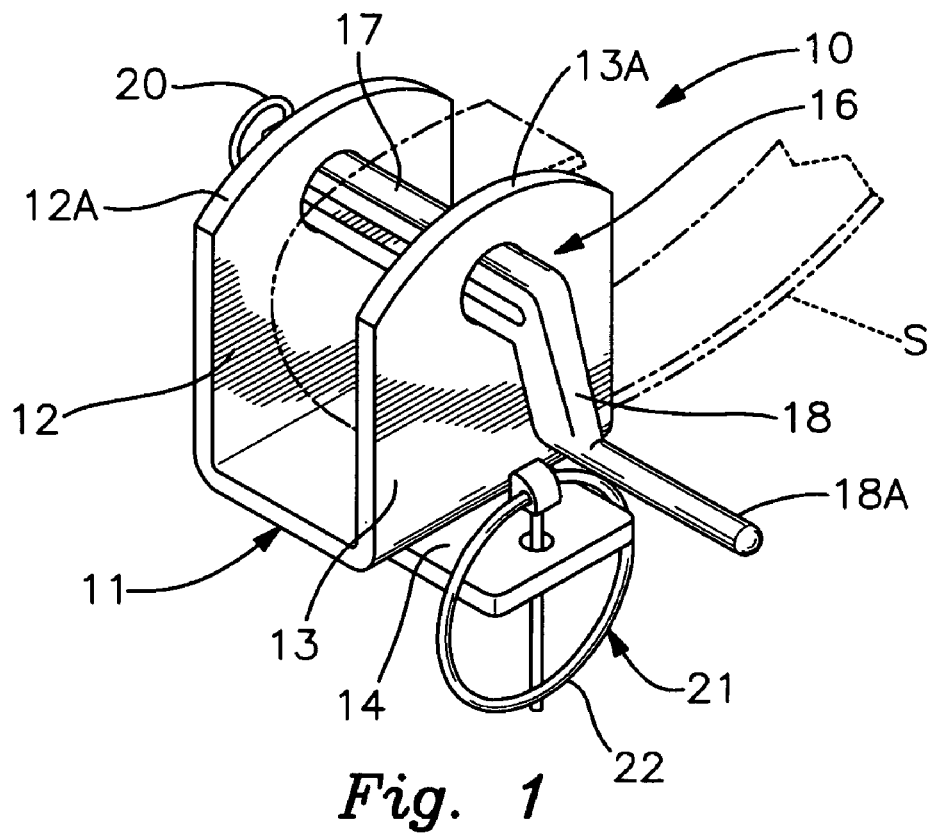
FIG. 1 is a perspective view of the strap winding device of the invention.
Figure 2:
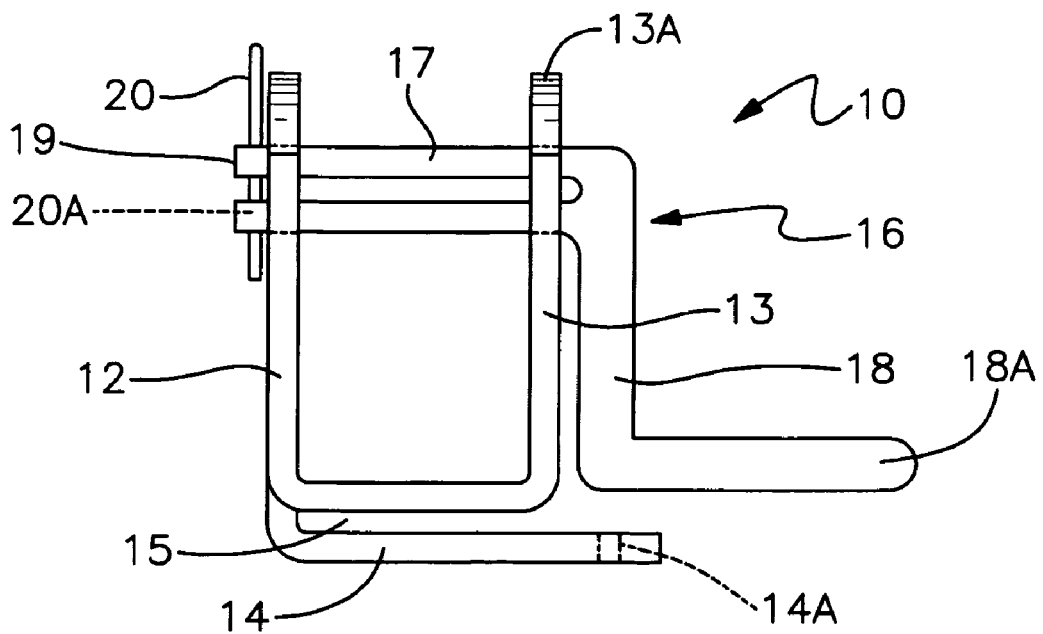
FIG. 2 is an end elevational view thereof.
Figure 3:
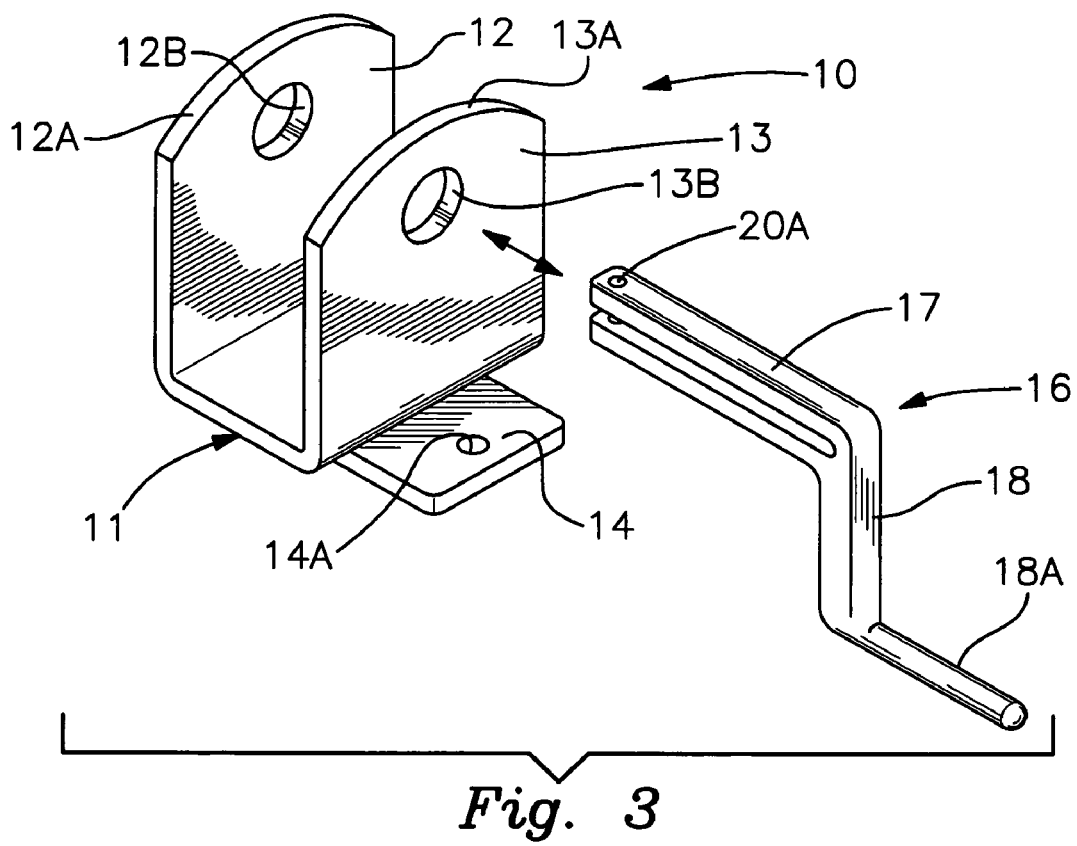
FIG. 3 is an exploded perspective view of the strap winding device.
Figure 4:
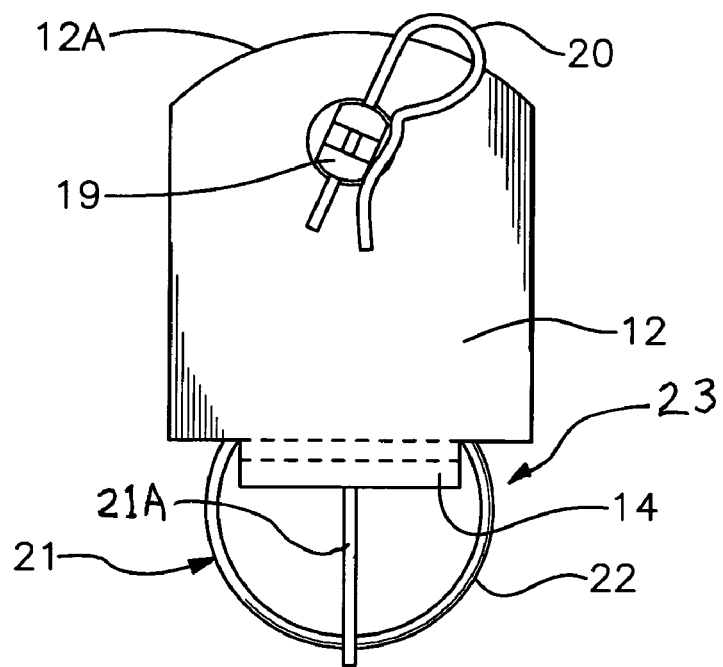
FIG. 4 is an enlarged rear elevational view.

Referring to FIGS. 1, 2 and 3 of the drawings, a strap winder 10 of the invention can be seen having a main U-shaped base 11 with parallel spaced upstanding support brackets 12 and 13 extending therefrom. A position attachment arm 14 extends from the bracket 12 below the base 11 transversely thereacross and beyond the respective bracket 13 defining a strap receiving slot 15 therebetween. The attachment arm 14 is of a lateral dimension less than that of the overlying base 11 with an aperture at 14A therein. Each of the corresponding support brackets 12 and 13 have a curvilinear top edge 12A and 13A with a bearing aperture 12B and 13B respectively therein.

A rotating shaft assembly 16, best seen in FIG. 3 of the drawings, has a split shaft portion 17 for receiving a tie down strap S shown in broken lines. A crank 18 extends from the end of the shaft portion 17 in oppositely disposed relation with the open split free end at 19. Crank 18 has a handle 18A extending therefrom which allows for manual rotation of the split shaft 17 when positioned through the respective and aligned apertures 12B and 13B in the support brackets 12 and 13 as seen in FIG. 2 of the drawings.

A shaft retainment pin 20 extends through the aligned openings 20A in the free ends 19 of the shaft portion 17, securing same for free rotation therewithin, as noted.

Figure 5:
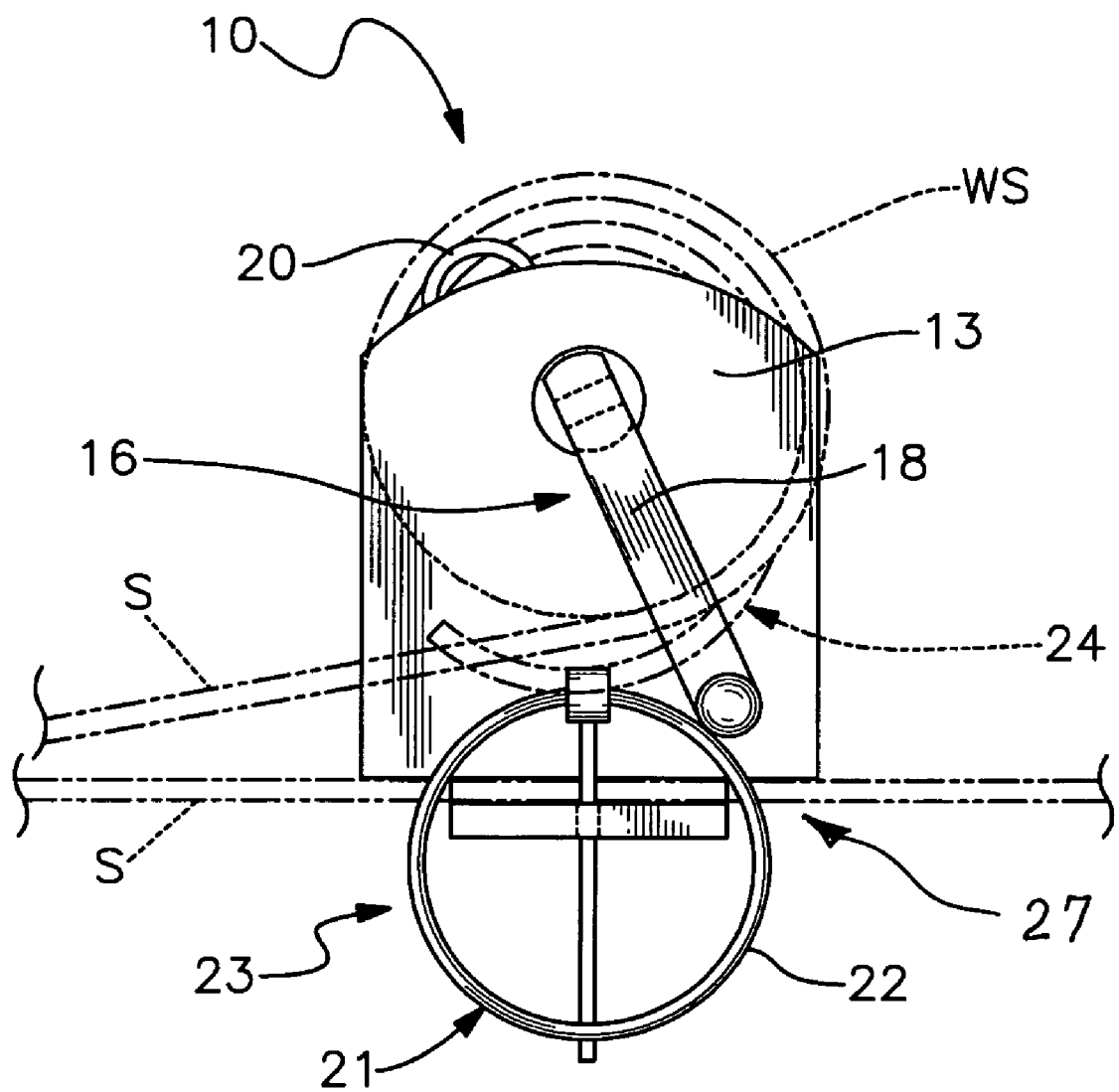
FIG. 5 is a enlarged front elevational view in use shown in broken lines.

A crank handle stop pin 21, best seen in FIGS. 1 and 5 of the drawings, has a pull retainment ring 22 extending from one end thereof in an off axial alignment. The retainment ring 22's configuration is well known within the art and imparts ring positioning resistance in the pin shaft 21A engagement lock position 23 and the pin removal (unlocked) position 24 shown in broken lines in FIG. 5 of the drawings.

It will be seen that due to the lateral determination of the attachment arm 14 extending portion, the retainment ring 22 will extend therearound preventing the removal of the pin shafts which will correspondingly block by its elevated position above the co-planar surface of the arm 14 the free rotation of the crank handle portion 18A as seen graphically in FIG. 5 of the drawings.

In use, the end of the tie down strap S is inserted through the split shaft 17 rotatably positioned between the support brackets 12 and 13 and upon crank rotation winds up the strap S therearound in a spooling action as illustrated in broken lines at 25 in FIG. 5 of the drawings. Once so spooled the stop pin 19 is reinserted in the apertured arm 14 and locked in place as hereinbefore described preventing further rotation of the crank arm handle portion 18A preventing additional spooling or unspooling of the strap S around the split shaft 17 which now retains the excess strap material, as noted.

The strap winder 10 of the invention can be selectively mounted on a portion of the retainment strap at 27 via the slot 15 defined by the attachment arm 14 at any effective position on the strap to correspond with the point of use activity required for winding strap access or storage and retainment of the strap in total for future use.

Additionally, it will be evident that the strap winder 10 can be used as a temporary strap storage venue when the straps are not in use and also as a deployment mechanism in which the strap winder 10 has the retainment pin stop 21 removed and can be used to freely rotate and deploy the strap S spooled thereon in a variety of user deployment interface actions.

It will thus be seen that a new and novel strap winder has been illustrated and described and it will be apparent to those skilled in the art that various changes and modifications may be made thereto without departing from the spirit of the invention.

Therefore I claim:

1. A spooling device for winding load tie down straps comprising,
   a rotatable split shaft, a bifurcated support bracket rotatably receiving said shaft,
   a strap attachment arm extending from said support bracket defining a strap receiving slot between said arm and of base of said support bracket,
   a crank extending from said split shaft and means for selectively retaining said split shaft in said support bracket, a retainment pin selectively movable from a first locked position through and about said attachment arm for interlocking and restricting crank and shaft rotation to a second unlocked removed position.

2. The spooling device set forth in claim 1 wherein said means for selectively retaining said shaft in said support bracket comprises,
   aligned bearing apertures in said brackets and a retainment pin extending through said split shaft in spaced relation to one of said bifurcated support brackets.

3. The spooling device set forth in claim 1 wherein said crank extending from said split shaft is of a length to engage said retainment pin when in said first locked position and rotating freely when said pin is removed from said retainment arm.

* * * * *